United States Patent Office 3,549,556
Patented Dec. 22, 1970

3,549,556
SPHERICAL METHANATION CATALYSTS
Edward K. Dienes, Louisville, Ky., assignor to Catalysts and Chemicals Inc., Louisville, Ky., a corporation of Delaware
No Drawing. Filed July 26, 1968, Ser. No. 747,846
Int. Cl. B01j 11/08, 11/40
U.S. Cl. 252—455                                6 Claims

ABSTRACT OF THE DISCLOSURE

Methanation involves the reaction of carbon oxides with hydrogen to form methane and water. Nickel methanation catalysts are most frequently employed, preferred catalysts being nickel on refractory cementitious supports. A nickel-cement methanation catalyst is provided having properties not heretofore obtained while still maintaining a high degree of activity.

BACKGROUND OF THE INVENTION

Heterogeneous catalysts in such processes as reforming, isomerizing, hydrogenating, hydrocracking, dehydrogenating, oxidizing, and the like, are continuously colliding, and rubbing over each other, their exposed edges and nonuniform surfaces being fragmented and worn away. Consequently the art of getting these catalysts into suitable solid states, and of making them strong enough to stay in these states without deterioration and breakage during use is frequently as much the heart of a catalyst problem as is finding the proper catalytic compound in the first place. In fact it is well recognized that heavy losses in chemical reactors are often attributable to the shape and hardness of the catalyst particles employed in the reactors. For this reason spherical catalysts would be very desirable. Spherical catalysts are also capable of packing well to form a homogeneous bed which minimizes channeling.

Ideally then for years, catalysts should have been made in the form of spheres. Nevertheless this has not been the case. For the most part rings, cylinders, and tablets have been used through the years. These were made by extruding or tableting the catalytic materials. When spherical catalysts were used, they were made by extruding short slugs, and tumbling these extruded slugs into balls in much the same way as pebbles are made for pebble heat exchange processes. One such process is set forth in U.S. 3,154,603.

Tableting requires compression of the catalysts between rotating steel punches moving in and out of a steel die. This not only requires tools of very closely machined tolerances, but lubricants, often harmful to the catalyst, must be added to minimize tool wear. Severe compression of catalyst materials required for tableting frequently results in loss of catalytic properties. The extrusion of catalysts presents much the same type of problem. As a consequence, for years catalyst manufacturers have sought to form catalysts into shapes with a minimum of destructive compression, preparation procedures, and the like. Yet spheres have not come into use.

The most desirable catalysts would be those made by a tumbling process such as that described in U.S. 3,177,151. However, it has not been thought feasible to apply this art to other catalysts due to the number of variables introduced in an already largely emperical and unpredictable field. It has also not been obvious to apply such granulation processes to other catalysts because their properties must be reproduced time after time. In addition in a tumbling process the salts and oxides of the active metals add another variable.

Alumina carriers have been made in spherical shapes; however, the surface area of the spheres is virtually uneffected by the granulation process. In other words surface areas of carriers obtained by granulation were virtually the same as those obtained by tableting. Accordingly, the improvement in catalyst shape was not believed to justify seeking solutions to the engineering problems involved. In accordance with this invention, however, a spherical methanation catalyst has been made having quite surprising and unexpected properties.

SUMMARY OF THE INVENTION

In accordance with this invention a methanation catalyst is provided. Methanation is applicable to the purification of gas streams such as a hydrogen stream where methane can be tolerated but carbon oxides cannot. Methanation involves the reaction of the carbon oxides with hydrogen to form methane and water. Nickel methanation catalysts are most frequently employed, preferred catalysts being nickel on refractory cementitious supports such as aluminas hydratable into beta alumina trihydrate, calcium aluminate and calcium silicate cements. In accordance with this invention a nickel-cement methanation catalyst is provided having properties not heretofore obtained while still maintaining a high degree of activity. This catalyst has an exceedingly high activity. Since the formulation of spherical alumina carriers, or supports, does not markedly change their surface areas, a tremendous change in porosity obtained herein is surprising indeed. Nickel oxide, alumina and a binder are used in making the catalyst.

DETAILED DESCRIPTION OF THE INVENTION

Brunauer and others in such works as "Catalysis," by P. H. Emmett, and "The Adsorption of Gases and Vapors," by S. Brunauer consider as active, those catalysts with small pores. Catalysts having large pores are considered inactive because conditions more closely approach true kinetics, as in the case of a plane catalytic surface. Whereas this is theoretically true, diffusion and contact time are nevertheless a function of pore structure. Thus there is a basis for the desirability of increasing pore size in order to decrease the necessity for molecular orientation, thereby increasing diffusion rates and improving the efficiency of contact.

In accordance with the practice of this invention of methanation catalyst precursor is provided in which the ratio of pores having diameters greater than 350 A. to total catalyst volume is in the range .50 to .70 cc./cc. In other words pores having diameters larger than 350 A. constitute 50 to 70 percent of the catalyst volume. Ninety to ninety-five percent of the total pore volume constitutes these macropores, i.e., pores having diameters larger than 350 angstrom units.

In the case of alumina carriers tumbled into spheres by granulation, surface areas of spheres formed are not radically different from those formed by tableting. The same condition has been found to obtain in the case of nickel methanation catalysts. Thus methanation catalyst precursors in the form of tablets have surface areas in the range of 50 to 250, depending on surface area of the oxides. The surface areas of spherical precursors are in the same range, and when the same oxides are used they are within a few square meters of surface areas of tablets. Consequently, it was not expected that the porosities of spheres would be any different. However a methanation catalyst is not known possessing the properties of those obtained according to the practice of this invention. The invention thus provides a methanation catalyst in the form of spheres having on the average specific gravities in the range of .6 to 1.0, bulk densities in the range of .400 to .656 gm./cc., total pore volumes in the range of .55 to .75 cc./cc., and a ratio of pores having diameters greater than 350 angstroms to total sphere volume in the range of .50 to .70 cc./cc., with a ratio of pores having diameters smaller than 350 angstroms to total sphere volume in the range of .01 to .10 cc./cc.

The methanation catalyst precursor contains 5 to 40 weight percent nickel oxide, 15 to 75 weight percent of a binder and 0 to 75 weight percent alumina, the total being 100 percent. The catalyst is in the form of spheres having particle sizes in the range of ⅛ inch to ⅜ inch, the particles being formed by tumbling a mixture of the nickel oxide, alumina and binder, and spraying the tumbling mass with a water spray. The properties are obtained by the addition of the dry ingredients and water to the tumbling mass in such proportions that a critical water content is maintained during granulation. The proportions are such that the loss on ignition of the resulting spheres is in the range of 20 to 40 percent by weight.

The alumina employed in the catalyst is any of the well known and readily available catalytic aluminas. This includes the alpha and beta monohydrates and trihydrates as well as transitional aluminas. Thus gibbsite, bayerite, nordstrandite, boehmite or diaspore either available from sources such as Kaiser, Alcoa or Reynolds, or produced initially from a mixture of precursor hydrous alumina phases, for instance by the process of U.S. 2,980,632, can be used.

When an alumina is used as a binder, only a transition form of alumina which is hydratable to the alpha alumina trihydrate, with, perhaps, some alpha monohydrate being formed, can be used. Thus if only nickel oxide and alumina are employed at least 15 percent of the catalyst composition must be a transitional alumina. If desired no mono or trihydrate alumina need be employed, which accounts for the 0 to 75 weight percent range given hereinbefore. Transitional aluminas used as binders are prepared according to U.S. 3,222,129. Examples of such transitional aluminas are rho and eta alumina.

The other binders are hydraulic binding agents such as alkaline earth, silicates, and aluminates, for example calcium silicate and calcium aluminates having the formulae $CaO \cdot 3Al_2O_3$, $CaO \cdot 2Al_2O_3$, $2CaO \cdot Al_2O_3$ or mixtures thereof, or aluminates of magnesium, iron, nickel and aluminates containing several elements as the basic components of the molecule.

The methanation catalysts of this invention are preferably prepared on a disc pelletizer of the type described in U.S. 2,889,576. The disc is a shallow pan mounted on a stediment at an angle between 40 and 60 degrees from the horizontal and it is rotated at speeds from about 8 r.p.m. to 40 r.p.m. Disc pelletizers are both agglomerators and mixers. In them, feed solids containing a range of particle sizes are moistened, tumbled and rolled until agglomerates of the required size are formed and ejected from the disc. The tumbling and rolling action of the solids on the disc surface not only causes agglomeration but also provides a driving force for mixing. In order to provide the pattern shown in U.S. 2,889,576, the pan must be set at proper angle and run at proper speed with proper location of incoming material feed and sprays. These settings will be developed in small scale research tests as will be known to those skilled in the art. Fines, seeds and pellets are classified in the disc. Only pellets of the proper size travel to the top of the bed and discharge over the rim. Disc pellets thus are very uniform in size and require little or no screening. Flow patterns and other details are set forth in U.S. 2,889,576 and they are incorporated herein by reference. Other processes contemplated are described in U.S. 3,177,151 and U.S. 3,030,657.

In accordance with this invention the properties achievable herein are obtained by controlling the quantity of water present during granulation. This is best controlled by operation of the granulation process to arrive at a loss on ignition of the resulting spheres in the range of 20 to 40 percent by weight. The quantity of sprayed water thus depends on the moisture content of raw materials. Spheres for which properties and tests are given herein were prepared as follows.

EXAMPLE A

| Composition: | Weight percent |
|---|---|
| Nickel oxide | 27 |
| Calcium aluminate cement | 25 |
| Beta alumina trihydrate | 48 |

Using the above percentages as parts by weight, the weighed dry components are blended in equipment to ensure a homogeneous feed to the granulating disc of U.S. 2,889,576 operated to produce one-fourth-inch diameter (average) spheres at an angle of 30 degrees from the horizontal and at 27 r.p.m. as taught by the patent. Formation of spheres is initiated by wetting some of the powdered feed under tumbling action. These wetted particles contact similarly wetted particles and coalesce because of surface tension to form nuclei for sphere formation. Nucleation occurs in localized regions near water sprays. Powdered feed and water are alternately added in this region in amounts of 353 pounds of feed per hour and 100 pounds of water per hour. As the nuclei grow and acquire mass by collision with other wet or dry particles, centrifugal force overcomes friction and the nuclei leave the nucleation region and enter the growth zone. As the bed thus develops in the pan a nozzle is moved to the growth zone. Here particles grow until they are ejected from the lip of the disc as product. Product leaving the disc with a loss on ignition of 28 percent has a specific gravity of 0.8; a bulk density of 0.53; and a macroporosity (pores greater than 350 Angstroms) of 58 percent.

Tablets compared with these spheres were prepared according to the following example.

EXAMPLE B

| Composition: | Weight percent |
|---|---|
| Nickel oxide | 27 |
| Calcium aluminate cement | 25 |
| Beta alumina trihydrate | 48 |

As in Example A the nickel oxide, calcium aluminate cement, and beta alumina trihydrate were mixed with sufficient water to form a heavy mud. The mud was then dried to a loss on ignition in the range of 25 to 30 percent and graphite was added as a lubricant to assist in tableting. The dried components were tumbled while being sprayed with water, to bring about agglomeration into particles. The particles were then fed to a tableting machine to form ¼ inch by ¼ inch tablets for use herein which were dried and calcined at 750° F.

By varying operating conditions in Example A methanation catalysts were prepared containing the same ingredients but having a range of porosities. The K values of these catalysts which correspond to the various macroporosities, defined herein as the ratio of pores having diameters larger than 350 angrstoms to catalyst particle volume, are given in the following table. The K value used in this table and elsewhere herein is an activity value. It is a simplified form of a reaction rate constant for a first-order reaction. This constant is discussed in Chemical Process Principles, Part III, by Olaf Hougan and K. Watson, John Wiley & Sons, Inc., 1947, and in I & E C, vol. 41, August, 1950, p. 1600. As used herein:

$$K = SV \log_{10} \frac{1}{1 - \text{fraction of Theoretical Conversion}}$$

SV is the space velocity defined as the total volume of gas measured in standard cubic feet (s.c.f.), (i.e., at 1 atm. and 60° F.) per hour per cubic foot of catalyst. In other words, this is the time term in the reaction rate expression. The CO in the above expression can be expressed in any units as long as the units are consistent for the CO concentration in the inlet, CO in the outlet, and CO at equilibrium. The K value may not adequately express the true mechanism of the methanation reaction over the catalysts in mathematical terms. However, it has been found to be a reliable means of expressing the activity from bench scale tests and for designing commercial units.

Contrary to the accepted belief that macropores lead to an inactive catalyst, the data in Table 1 which follows show that in the case of this methanation catalyst the unusually high macroporosity produces a more active catalyst.

TABLE 1—SPHERES

| Macroporosity, percent | Activity, K value |
|---|---|
| 66.63 | 22,150 |
| 59.32 | 16,600 |
| 56.52 | 29,500 |
| 54.75 | 16,350 |
| 50.84 | 10,000 |
| 49.00 | 7,910 |
| 43.97 | 3,600 |

It is emphasized that macroporosities of the magnitude set forth in Table 1 have not been obtained heretofore. Catalysts prepared as tablets rarely have macroporosities as high as 45 percent of the total catalyst volume with activities shown in Table 2. These tablets were prepared according to Example B.

TABLE 2—TABLETS

| Macroporosity, percent | Activity, K value |
|---|---|
| 46.80 | 9,125 |
| 39.83 | 2,400 |
| 26.16 | 6,500 |

Extrusions on the other hand have macroporosities in the range of 20 to 40 percent of the total catalyst volume, and K activity values not usually exceeding 8,000.

One of the advantages of producing spheres as contemplated herein is that activity is not as dependent on the properties of the nickel oxide. Activity is more dependent on the surface areas of the nickel oxide used in table production than it is in the case of spheres. This will be apparent from the following wherein 27 percent nickel oxide was employed in two compositions made from nickel oxides having different surface areas.

TABLE 3

| Surface area of nickel oxide used, m.²/gm. | Form | Surface area of precursor | Activity, K value |
|---|---|---|---|
| 60 | Tablet | 39 | 2,400 |
| 200 | do | 69 | 9,125 |
| 60 | Sphere | 43 | 16,000 |
| 200 | do | 77 | 19,000 |

The improvement due to a high surface area nickel oxide is thus not as great when spheres are produced according to the teachings of this invention.

In addition to a certain independence of surface areas of raw material, activities of spherical methanation catalysts prepared herein are also fairly independent of percent nickel. This is exemplified by the following table, spheres being made according to Example A.

TABLE 4

| | Total pore volume | K |
|---|---|---|
| Percent Nickel: | | |
| 19.4 | .32 | 11,800 |
| 21.1 | .34 | 12,500 |
| 19.0 | .48 | 19,800 |
| 21.0 | .51 | 21,000 |
| 18.7 | .38 | 15,200 |
| 19.8 | .45 | 19,000 |

It has been pointed out that there is an unexpected change in pore structure even though the surface area (S.A.) does not radically change during granulation to form spheres. This is seen in the average of runs reported in Table 5 in terms of pore volume. As in other data reported herein except where indicated, the catalyst contained 27 weight percent nickel oxide, 25 weight percent calcium aluminate cement and 48 weight percent beta alumina trihydrate.

TABLE 5

| | Spheres | Tablets |
|---|---|---|
| Density | 44 | 57 |
| S.A. m.²/gm | 50 | 58 |
| Pore volume | 0.5 | 0.2 |
| K value | 23,000 | 10,000 |

As is most generally the case, if the loss on ignition is controlled within the specified limits, resulting spheres will have higher activity values, even in view of greater macroporosities, than tablets. These higher activities are also obvious from the averages in Table 5.

Referring now to loss on ignition, if the loss on ignition, as determined on spheres leaving the spheroidizing disc, is above 40 weight percent, activities in the range of 6,000 to 8,000 are obtained whereas at a lower operating loss on ignition activities range from 16,000 to 40,000. If the loss on ignition is below 20 weight percent, the catalyst has such poor physical properties that it is unsatisfactory.

This invention thus provides an excellent catalyst precursor which on calcination and reduction promotes reactions between carbon oxides and hydrogen to form methane. By controlling the quantity of water present during granulation microporosities in the range of 9 to 95 percent of the total pore volume are obtained. The amount of nickel oxide, the type of alumina, and the particular binder will be obvious to those skilled in the art. Such variations and ramifications are within the scope of this invention.

What is claimed is:

1. A catalyst precursor which on calcination and reduction promotes reactions between carbon oxides and hydrogen to form methane comprising (a) 5 to 40 weight percent nickel oxide, (b) 15 to 75 weight percent of a binder selected from the group consisting of an activated, transition form of alumina hydratable into beta alumina trihydrate, calcium aluminate cement and calcium silicate cement, and (c) 0 to 75 weight percent alumina, in the form of spheres, the quantities of (a), (b), and (c) totaling 100 percent, the spheres having on the average specific gravities in the range of .6 to 1.0, bulk densities in the range of .400 to .656 gm./cc., total pore volumes in the range of .55 to .75 cc./cc., and a ratio of pores having diameters greater than 350 angstroms to total sphere volume in the range of .50 to .70 cc./cc., with a ratio of pores having diameters smaller than 350 angstroms to total sphere volume in the range of .05 to .1 cc./cc. formed by tumbling a mixture of the nickel oxide, alumina, if used, and binder, and spraying the tumbling mass with a water spray, the porosities being obtained by the addition of the dry ingredients and water to the tumbling mass in such proportions that the loss on ignition of the resulting spheres is in the range of 20 to 40 percent by weight.

2. The catalyst precursor of claim 1 containing 15 weight percent nickel oxide, 35 weight percent alumina trihydrate, and 50 weight percent rho alumina.

3. The catalyst precursor of claim 1 containing 27 weight percent nickel oxide, 48 weight percent beta alumina trihydrate, and 25 weight percent calcium aluminate cement.

4. The catalyst precursor of claim 1 containing 20 weight percent nickel oxide, 20 weight percent alumina trihydrate, and 60 weight percent eta alumina.

5. The catalyst precursor of claim 1 containing 30 weight percent nickel oxide and 70 weight percent rho alumina.

6. The catalyst precursor of claim 1 containing 27 weight percent nickel oxide, 38 weight percent beta alumina trihydrate, and 35 weight percent calcium silicate.

References Cited

UNITED STATES PATENTS

| 3,264,069 | 8/1966 | Getty | 252—448X |
| 3,445,402 | 5/1969 | Reitmeier | 252—466 |

PATRICK P. GARVIN, Primary Examiner

C. F. DEES, Assistant Examiner

U.S. Cl. X.R.

252—459, 466